United States Patent [19]

Anderson

[11] 3,909,881

[45] Oct. 7, 1975

[54] APPARATUS FOR MAKING A HOLLOW HAMBURGER

[76] Inventor: Carlton O. Anderson, 4715 Nebraska Ave., Omaha, Nebr. 68104

[22] Filed: Jan. 9, 1974

[21] Appl. No.: 432,073

[52] U.S. Cl. ............... 17/32; 426/513; 426/514; 17/25
[51] Int. Cl. ............................................. A22c 7/00
[58] Field of Search ........ 17/25, 32, 45, 1; 426/513, 426/514

[56] References Cited
UNITED STATES PATENTS

| | | | |
|---|---|---|---|
| 2,521,995 | 9/1950 | Priddy | 426/513 |
| 2,981,973 | 5/1961 | Elmore | 17/45 |
| 3,411,176 | 11/1968 | Holly | 17/32 |
| 3,775,809 | 12/1973 | Roedel | 17/32 |

*Primary Examiner*—Louis G. Mancene
*Assistant Examiner*—James Hamilton

[57] ABSTRACT

A hamburger having a hollow cavity extending through the side thereof adapted to received condiments thereinto after cooking, the method of preparing the hamburger comprised of stuffing hamburger meat into a mold, inserting a tin foil type pocket into the hamburger meat through a side thereof, and packaging the formed hamburger for storage and sale, the hamburger adapted to be cooked in the normal manner after which the tin foil is removed from the pocket of the cooked hamburger and condiments inserted into the pocket in a manner to be consumed with the hamburger.

1 Claim, 6 Drawing Figures

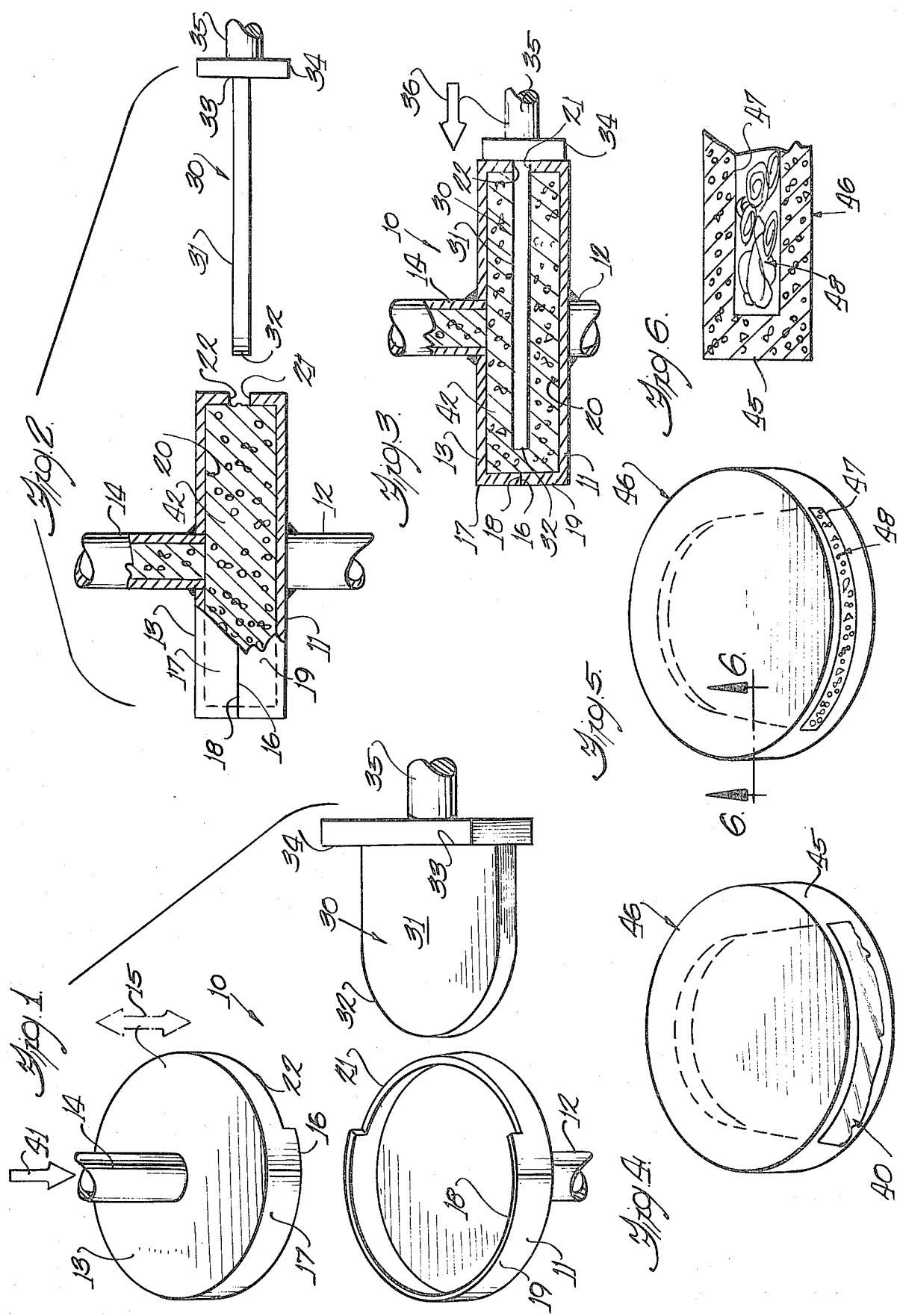

APPARATUS FOR MAKING A HOLLOW HAMBURGER

BACKGROUND OF THE INVENTION

1. Field of the Invention

This invention relates generally to food products and more particularly to a hamburger having a hollow center portion as well as to an improved method and apparatus for making the hamburger.

2. Description of the Prior Art

Conventional type of hamburgers are commonly made by placing hamburger meat into a round hollow mold of a generally circular shape such that disc shaped hamburgers may then be cooked in any convenient method for consumption by the individual. However, most individuals normally enjoy additional condiments with their hamburgers, such as onions, ketchup, mustard, relish, pickles or the like, with such condiments normally being placed atop the hamburger adjacent bread or the like to form a hamburger sandwich.

However, it is not unusual for such condiments to fall out of the sandwich while the individual is eating the same, this causing a mess while eating the sandwich along with posing the risk of spoiling an individual's clothing should such condiments accidentally fall thereonto.

Further, many individuals are on diets such that they wish to eliminate bread consumption, and yet such individuals enjoy hamburgers with condiments thereon so that it is presently difficult for such individuals to eat a hamburger with condiments thereon without having to use bread or the like in the form of a hamburger sandwich.

SUMMARY OF THE INVENTION

The present invention provides a novel solution to the aforementioned difficulties by providing a hamburger having a hollow center portion which may be filled with condiments of an individual's liking in a neat, convenient and compact manner with such condiments being retained therein so as to not fall from the sandwich when being eaten by an individual, and further, with such condiments being neatly contained therein so that an individual may eat the hamburger with a knife and fork and without bread while still having the full flavor and use of the condiments in an enjoyable manner.

It is a feature of the present invention to provide a hamburger having a hollow center portion.

A further feature of the present invention provides the method and apparatus for making hamburgers having a hollow center portion.

Among further features and advantages of the present invention is the provision of a hollow hamburger and the apparatus and method for making the same, and all of which are easy to use and reliable and efficient in operation.

Further features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the hamburger mold and the pocket forming mandrel;

FIG. 2 is a side elevational view of the closed mold partially broken away to illustrate interior details thereof with the mold filled with hamburger meat and with the mandrel separate therefrom;

FIG. 3 is a view similar to FIG. 2 but with the mandrel inserted thereinto;

FIG. 4 is a perspective view of the completed hollow hamburger with the tin foil lined pocket defined therein;

FIG. 5 is a perspective view of the hamburger after it has been cooked and with condiments inserted into the pocket thereof; and FIG. 6 is an enlarged cross-sectional view taken along Line 6—6 of FIG. 5.

DESCRIPTION OF THE PREFERRED EMBODIMENT

Referring now to the drawings in detail there is illustrated a hamburger mold 10 having a bottom portion 11 fixedly supported on a rod 12 and a top mating portion 13 movably supported by hollow rod 14 for vertical reciprocal movement in the direction of arrow 15 between a closed position where the edges 16 of side walls 17 are in abutting relationship with the edges 18 of side walls 19 so as to define a hamburger forming cavity 20 therebetween. An annular recess 21 is provided in bottom portion 11 with a similar cooperating annular recess 22 being formed in top portion 13, the annular recesses defining an entrance into cavity 20 when the mold is in the closed position and which is adapted to receive therethrough a pocket making mandrel 30 having a platform 31 with an arcuately curved leading edge 32 and a flat back edge 33 which is affixed to a support member 34 mounted on control rod 35 operable in a manner to reciprocally move the mandrel in a horizontal plane normal to the axis of the cavity 20, such as designated by arrow 36, between a position where platform 31 is interposed in cavity 20 and a position where the platform is separate therefrom. The platform 31 is adapted to receive thereover a tin foil formed pocket 40 as will be later described.

In operation, mold 10 is closed with edges 16 and 18 in abutting relationship after which hamburger meat product is forced in the direction of arrow 41 down through tube 14 in a manner to fill cavity 20, the hamburger product being designated generally by reference numeral 42. Mandrel 30 is then moved in the direction of arrow 36 to insert platform 31 into food product 42 in cavity 20 in a manner to insert into the formed hamburger the tin foil defining pocket member 40 which opens out of one side 45 of the formed hamburger 46 as seen in FIG. 4. Mandrel 30 is then withdrawn from cavity 20 leaving the tin foil pocket member 40 in the hamburger meat 42, after which mold top member 13 is moved apart from mold bottom member 11 and the formed hamburger removed from the cavity and packaged for storage and sales in the conventional manner.

In use, an individual cooks the hamburger in any normal conventional manner with the tin foil pocket member 40 disposed therein, this tin foil member accelerating the speed of cooking due to conveying heat directly to the interior of the hamburger, after which the pocket member 40 is removed from the cooked hamburger leaving a hollow pocket type chamber 47 in the hamburger which is adapted to have stuffed thereinto pickles, cheese, mustard, relish, ketchup, onions, or any other condiments or combinations thereof at the desires of the individual who will be consuming the hamburger, such condiments being generally designated by reference numeral 48.

It is thus seen that not only is the cooking time of the hamburger materially shortened because of the insertion of the heat conducting tin foil directly through the center of the hamburger, this cooking the hamburger meat both from the inside as well as from the outside, but that condiments may be conveniently and neatly inserted into the hamburger in a manner to be eaten directly with the hamburger when the hamburger is served either in a plate by itself or between bread in the form of a hamburger sandwich.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

I claim:

1. Apparatus for making hamburgers having hollow center portions and the like comprising a mold having substantially identical first and second mating half portions, said first half portion having a circular horizontal base with surrounding vertical cylindrical side walls defining an open topped chamber therebetween, said first half portion fixedly secured by a rod to prevent movement thereof, said second half portion being of a substantially identical size and shape and configuration to said first half portion and including a horizontal circular base portion with depending vertical cylindrical side walls thereabout defining an open bottomed chamber therebetween adapted to be disposed in confronting relationship with the chamber of said first portion, hollow tube means supporting said second portion for reciprocal vertical movement into and out of engagement with said first portion, said hollow supporting member providing for communication with said compartments when said molds are in their closed positions onto each other, a circumferal recess defined in each of said first and second portions sidewalls, said recesses disposed in confronting relationship and forming a circumferal slot when said second half portion is in engagement with said first half portion, a pocket defining mandrel mounted for reciprocal movement in a plane normal to the axis of said first and second half portions, said mandrel comprising a flat platform member having an arcuate leading edge and a flat back edge, a support member affixed to said back edge for supporting said platform member, a support control rod affixed to said support member for effecting reciprocal movement of said mandrel relative to said mold, said platform being of a size and configuration adapted to be received freely through said circumferal slot to form a pocket in meat products compressed into said mold chamber, and a tin foil pocket defining member disposed over said platform in a manner to be forcably inserted into said meat product when said platform is inserted through said slot into said chamber, said tin foil pocket remaining in said meat product when said platform is withdrawn from said meat product to thus define a pocket in said meat product for later stuffing of condiments and the like after said meat product has been cooked, said tin foil further serving to materially shorten the cooking time of said meat product as it conducts heat so that the meat is cooked both from the inside as well as from the outside.

* * * * *